D. J. JOHNSTON.
SEAT SUPPORT FOR MOTOR CYCLES.
APPLICATION FILED JAN. 29, 1913.
1,088,028.
Patented Feb. 24, 1914.
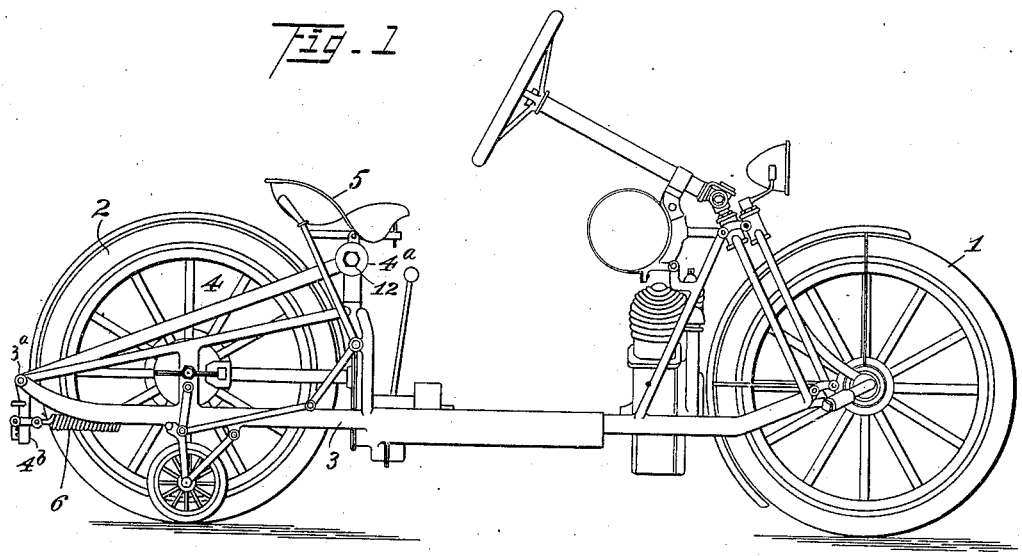
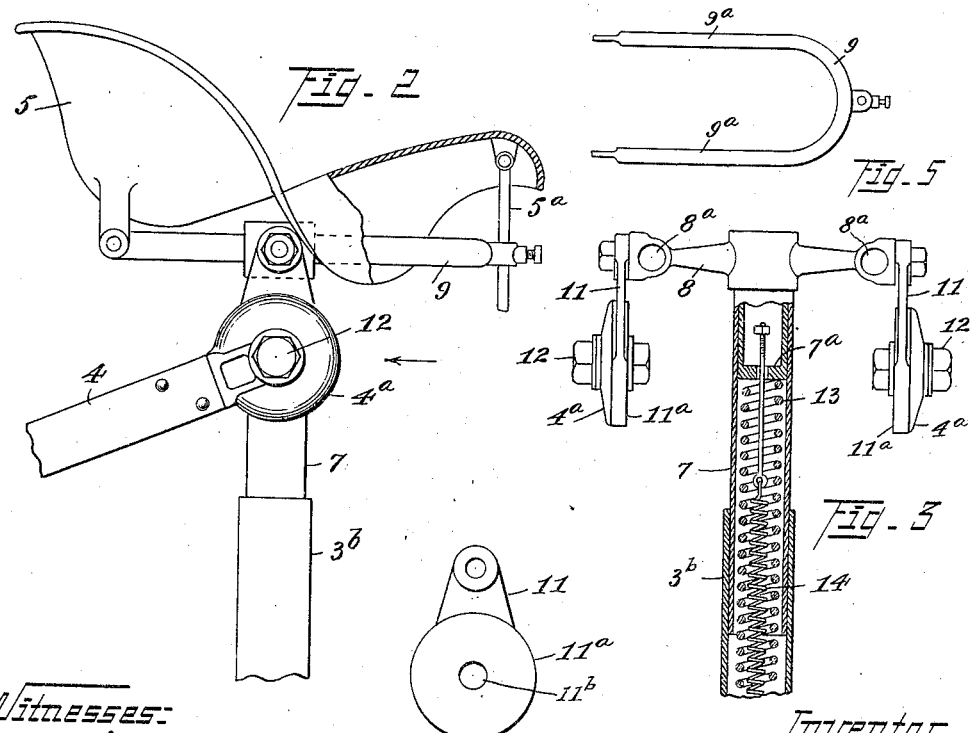

UNITED STATES PATENT OFFICE.

DAVID JAMES JOHNSTON, OF TORONTO, ONTARIO, CANADA, ASSIGNOR TO THE MILITAIRE AUTO COMPANY INC., OF CLEVELAND, OHIO, A CORPORATION OF OHIO.

SEAT-SUPPORT FOR MOTOR-CYCLES.

1,088,028. Specification of Letters Patent. Patented Feb. 24, 1914.

Application filed January 29, 1913. Serial No. 744,853.

*To all whom it may concern:*

Be it known that I, DAVID JAMES JOHNSTON, a subject of Great Britain, residing at Toronto, in the Province of Ontario and Dominion of Canada, have invented a certain new and useful Seat-Support for Motor-Cycles, of which the following is a specification.

My invention relates to the construction, arrangement and coöperation of the various parts of the mechanism for supporting the seat of two-wheeled vehicles, or motor-cycles, and has for its objects, the providing of a seat suspension that can be readily adjusted to accommodate the load, relieve the shock and thereby enhance the comfort of the rider. I attain these objects by the combination and arrangement of the parts shown in the drawings, in which—

Figure 1 is a side elevation of a motorcycle embodying the improvement. Fig. 2 is an enlarged fragmentary view of the seat attachment. Fig. 3 is a view of a portion of the seat attachment in direction of arrow Fig. 2, with seat removed and spring barrel in section. Fig. 4 shows one of the friction links, detached, and Fig. 5 is a plan view of the seat bracket, on a reduced scale.

Throughout the drawings and specification, similar characters of reference are used to designate similar parts.

The following specification will, as a matter of course be confined to the particular improvement claimed, the general construction of the vehicle being entered into only so far as it appertains to the said improvement. Other parts of the machine may be of various different designs and construction without affecting the usefulness and operation of the invention. There may also be minor changes in details of the devices described which will in no way depart from the nature of the invention.

Referring to Fig. 1 of the drawings, 1 and 2 are the front and rear wheels respectively of a two-wheel vehicle or so-called motor-cycle.

3 is a side bar of the frame. There are two of these side bars, only one of which is shown, the other being substantially the same except that it is designed for the opposite side of the machine. Pivoted to the side bars 3 at their rear terminals $3^a$ and on opposite sides of the rear wheel 2, are levers of the bell-crank type. These levers are identical in construction except that they are right and left. In fact nearly all of the parts of the seat adjustment mechanism are right and left duplicates, and to facilitate the explanation, the description will be confined to one side. Where single means are used to coöperate with the duplicate parts it will be designated. One arm 4 of the bell-crank lever, extends upward and forward to a point beneath the seat 5, and is provided at its forward extremity with a disk $4^a$. The arm $4^b$ of the bell-crank has a spring connection 6 with the side bar 3, and is provided with suitable means for adjusting the tension. The seat post is made up of the tube member $3^b$ which is a part of the frame, and the tube member 7 which is adapted to telescope the member $3^b$. A bracket support 8 is attached to the upper end of the member 7. The member 8 supports the U-shaped bracket 9, which in turn supports the seat 5. Forward and back adjustment of the seat is provided by the arms $9^a$ of the bracket 9 sliding in the eyes $8^a$ of the support 8, and a tilting adjustment of the seat is provided by the connection of the member $5^a$ with the support 8. A link 11 is provided with a disk $11^a$ adapted to bear on the inner face of the disk $4^a$, and has an eye $11^b$ for attaching the link to the bracket support 8. The disks $11^a$ and $4^a$ are held together and the friction between them is regulated by a bolt 12. By the foregoing it will be seen that the link 11 forms a connection between the seat support and the lever 4, that is more or less flexible, according to the amount of friction between the bearing faces of the disks. The co-action of these parts forms an effective shock absorber.

Within the tube 7, near its upper terminal is a cross member or partition $7^a$. A spiral spring 13 is provided within the seat post between the partition $7^a$ and a stationary portion of the frame. This spring acts as a cushion, and its resiliency co-acting with the spring 6 through the intervening parts, overcomes rigidity and assures comfort to the rider of the vehicle. A secondary spring 14, having its lower terminal made fast to the frame, is inclosed within the spring 13 and acts to regulate the upward thrust of the spring 13.

The improved mechanism as described will admit of various detail changes in construction without departing from the nature of the invention as claimed.

What I claim as new and desire to secure by Letters Patent is as follows.

1. A motor-cycle seat support consisting of the combination of a telescopic post, a seat bracket support attached to said post, levers pivoted to the cycle frame and held under spring tension, links attached to the bracket support and connected with said levers, and means for regulating the friction in the lever and link joint, whereby a more or less flexible connection is formed.

2. A motor-cycle seat support consisting of the combination of a telescopic post, a cushion spring within said post, a seat bracket support attached to the upper part of the post, levers pivoted to the cycle frame and held under spring tension, links attached to the bracket support and connected with said levers, and means for regulating the friction in the lever and link joint, to form a more or less flexible connection.

3. In a motor-cycle seat support, the combination of the seat, a bracket to which said seat is adjustably attached, a telescopic post, a cushion spring within said post, a seat bracket support attached to the post, levers pivoted to the cycle frame and held under spring tension, links attached to the bracket support and connected with said levers, friction bearing faces on the links and levers at their joint, and means for regulating the friction between said bearing faces.

4. In a motor-cycle seat support, the combination of the seat, a bracket to which said seat is attached, a bracket support, means for horizontal and frictional adjustment of the seat with the bracket, a telescopic post, a cushion spring within said post, levers pivoted to the cycle frame and held under spring tension, links attached to the bracket support and connected with said levers, friction bearing faces on the links and levers at their joint, and means for regulating the friction between said bearing faces.

5. In a motor-cycle seat support, the combination of the seat, a bracket to which said seat is attached, a bracket support, means for horizontal and vertical adjustment of the seat with the bracket, a telescopic post, a cushion spring within said post, bell-crank levers pivoted to the frame, adjustable spring connection between said levers and the frame, links attached to the bracket support and connected with said levers, friction bearing faces on the links and levers at their joint, and means for regulating the friction between said bearing faces.

DAVID JAMES JOHNSTON.

Witnesses:
FRED C. SCHLATTER,
F. GRISWOLD.

Copies of this patent may be obtained for five cents each, by addressing the "Commissioner of Patents. Washington, D. C."